Nov. 3, 1970   E. P. RÜTTENER   3,537,712
SHAFT SEAL

Filed Nov. 20, 1967   2 Sheets-Sheet 1

INVENTOR
Erwin Paul RÜTTENER

By Abraham A. Saffitz
ATTORNEY

United States Patent Office 3,537,712
Patented Nov. 3, 1970

3,537,712
SHAFT SEAL
Erwin Paul Rüttener, Riehen, Basel, Switzerland, assignor to Buss A.G., Basel, Switzerland
Filed Nov. 20, 1967, Ser. No. 684,320
Claims priority, application Switzerland, Nov. 21, 1966, 16,761/66
Int. Cl. F16k 41/00; F16j 15/00
U.S. Cl. 277—30    1 Claim

ABSTRACT OF THE DISCLOSURE

This invention provides a sealing device for a shaft which has a rotation axis that deviates from the longitudinal axis of the shaft. The shaft is rotatably mounted in a housing, in the inside wall of which a mounting ring is fixed. A ring-shaped sealing member bears snugly against the surface of the shaft and is connected, preferably through the intermediary of an elastic intermediate ring, to the mounting ring. The sealing device is at least radially movable and may be equipped with a cooling system.

BACKGROUND OF THE INVENTION

This invention relates to a sealing device for a shaft which is rotatably mounted in a housing and the rotation axis of which deviates from its longitudinal axis when it is subjected to load. In particular, the passage through the shaft bearing of liquid or dry materials which are processed in the working chamber of the housing is to be prevented.

Sealing rotatable and to-and-fro movable shafts by means of stuffing boxes is well known in the art. But these stuffing boxes only work satisfactorily when the shaft to be sealed is exactly guided by a support in the immediate vicinity of the stuffing box. However, with these devices it is often necessary to mount this support at a certain distance from the stuffing box such that the shaft cannot be exactly guided. With mixing and kneading machines for example where the support is arranged outside the working chamber, any contact between the materials to be processed and the lubricant must be avoided. A satisfactory sealing of the shaft is absolutely necessary. The shaft of such a machine which, in addition to rotating often carries out a simultaneous to-and-fro movement, is often subjected to bending so that the axis of the shaft no longer coincides with that of the stuffing box, since the shaft rotates eccentrically. Thereby the shaft seal is very heavily stressed and must be frequently adjusted.

The suggestion has already been made to employ a stuffing box which participates in the movements of the shaft and fits tightly against a surface extending normal to the axis of the shaft. However, such stuffing boxes are extremely complicated since they must have additional sealing surfaces.

SUMMARY OF THE INVENTION

It is the object of the present invention to provide a sealing device for a shaft, which is rotatably mounted in a housing and the rotation axis of which deviates from its longitudinal axis, which attains a good and durable seal by simple means.

The proposed sealing device comprises a mounting ring fixed in a housing through which a shaft extends, and a ring-shaped sealing member bearing snugly against the surface of said shaft and connected with said mounting ring so as to be movable in at least a radial direction.

According to an advantageous embodiment of the invention, an elastic intermediate ring is arranged between the mounting ring and the ring-shaped sealing member and connected thereto by gluing or vulcanizing.

It is also possible to use a felt gasket or the like which is connected with the mounting ring through the intermediary of an elastic intermediate ring which can yield radially and consists of one or more separate parts, while the connection is surrounded on both sides with sealing washers made, for example, of soft rubber.

BRIEF DESCRIPTION OF THE DRAWINGS

Several embodiments of the invention will now be described by way of example and with reference to the accompanying drawings, in which.

DESCRIPTION OF THE PREFERRED EMBODIMENTS

Figure 1:
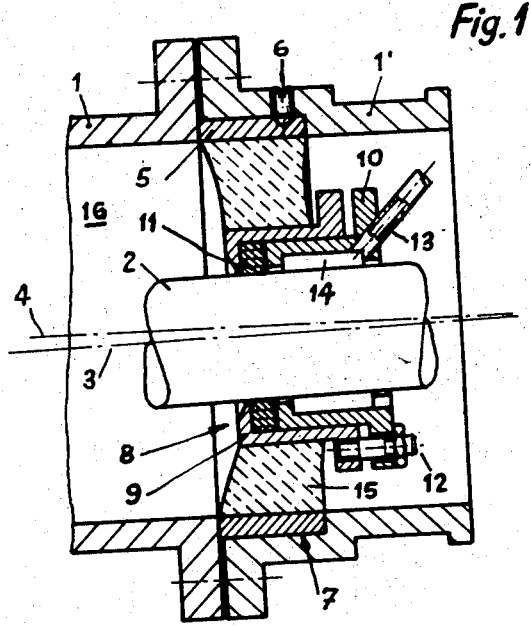
FIG. 1 is an axial cross section of a sealing device according to the invention.

FIG. 1 shows a sealing device which serves to seal a shaft 2 which is rotatably mounted in a two-part housing 1, 1' so that its longitudinal axis 3 does not coincide with the longitudinal axis 4 of the housing, but extends at a slight angle thereto. A mounting ring 5 is received in a corresponding groove 7 in the housing part 1' and is secured against turning therein by a setscrew 6 which passes radially through the wall of the housing part 1' and engages in a radial hole in the mounting ring 5.

A ring-shaped sealing member, for example a stuffing box 8, is arranged on the shaft 2 and consists of a stuffing box housing 9 and a gland 10 which can be adjusted relative to each other by means of an adjusting screw 12 and which accommodate in a customary way a gasket such as a felt gasket 11 which is clamped between them and bears against the surface of the shaft 2. The gland 10 is provided with a connection piece 13 for a flexible tube through which a coolant can be introduced into a recess 14 formed in the gland 10 so that high temperatures cannot arise between the stuffing box 8 and the shaft 2.

An elastic intermediate ring 15 made of rubber or the like is positioned between the outside of the stuffing box 8 and the inside of the mounting ring 5 and is attached thereto by gluing or vulcanizing.

A working chamber 16 on the left-hand side of the stuffing box 8 in FIG. 1 serves to receive the material to be processed, whereas a supporting bearing (not shown) is arranged on the right-hand side of the stuffing box 8 and serves to support the shaft 2 at a distance therefrom.

Figure 2:
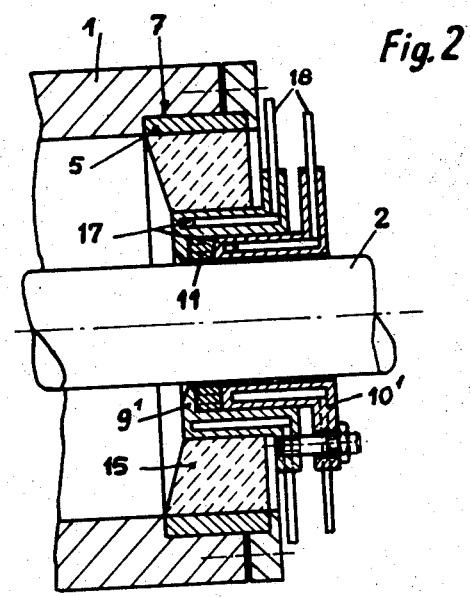
FIG. 2 is a similar view of a second embodiment of the sealing device.

FIG. 2 shows another embodiment of the sealing device which is based on the same principles as the embodiment of FIG. 1 with only the difference that a closed cooling system is provided for cooling the stuffing box. In this embodiment, a stuffing box housing 9' and a gland 10' are provided with closed coolant channels 17 which are fed with a coolant through flexible tubes 18.

Figure 3:
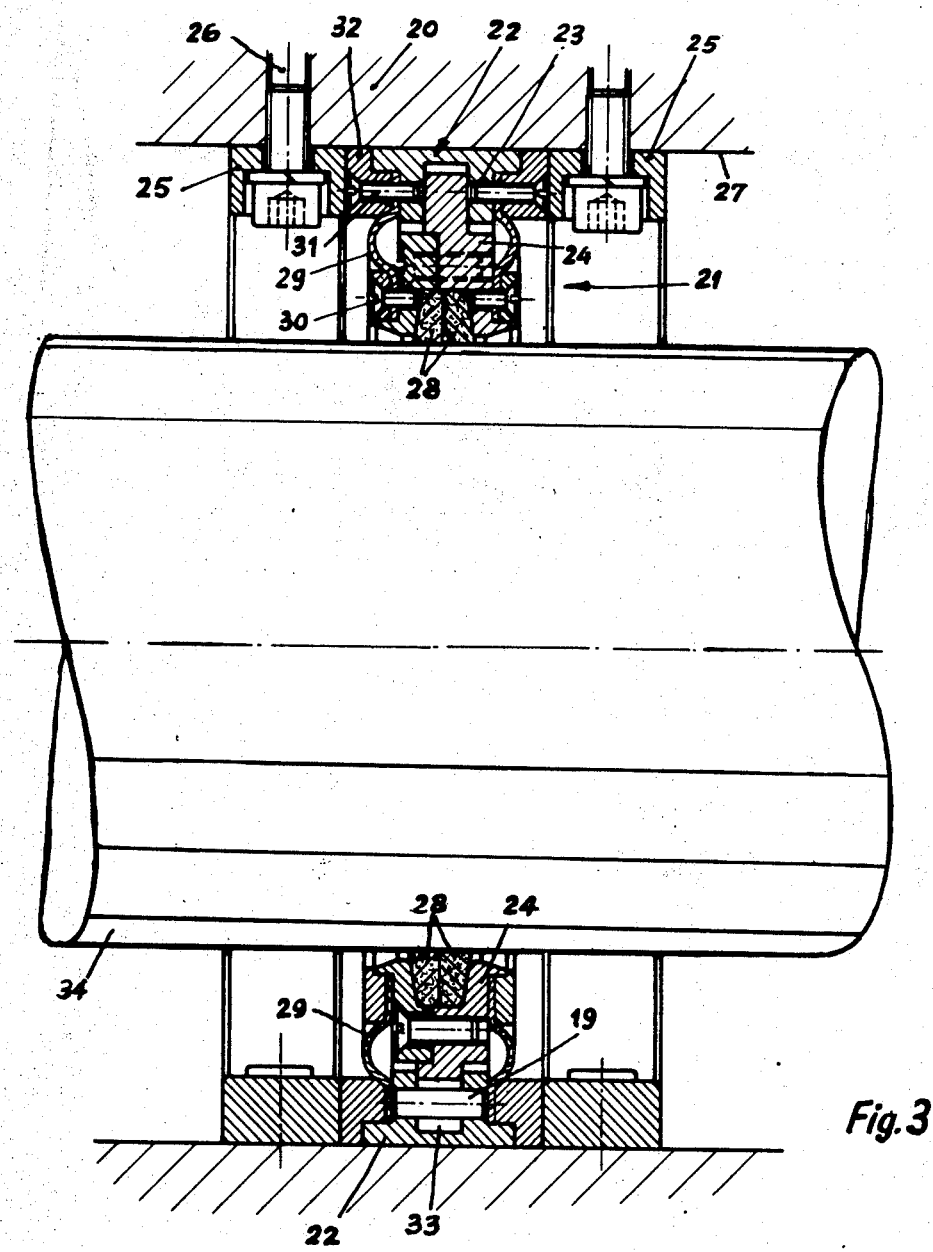
FIG. 3 is a similar view of a third embodiment of the sealing device with felt washers.

A third embodiment of the subject matter of the invention is shown in FIG. 3, where a shaft 34 is arranged in a housing 20 and provided with a sealing member 21. This sealing member 21 has a mounting ring 22 made preferably in two parts and having an outer diameter corresponding to the inner diameter of the housing 20 and with two ribs 23 running parallel to each other and extending radially inwardly to define a groove in which a sealing ring 24 consisting of two combined halves is received. A holding ring 25 is fixed on the inner wall 27 of the housing 20 by means of screws 26 and is provided on both sides of the guide ring 22 for confining it axially. The sealing ring 24 is provided with a gasket, for example a ring-shaped felt gasket 28, which bears snugly against the surface of the shaft 34. The sealing ring 24 together with the ring-shaped felt gasket 28 is radially movable in the guide ring 22. A seal 29 which consists of a flexible sealing washer and is connected on its inner edge to the sealing ring 24 by means of screws 30 and on its outer edge to the guide ring 23 by means of screws 31, is provided on each side of the sealing ring 24. Two outer rings 32 which are provided with holes distributed around their circumference for receiving the screws 31 hold the outer edge of each seal 29 tightly between the outer ring 32 and the facing rib 23 of the mounting ring 22. The holes in the outer rings 32 correspond with those in the seals 29 and those in the ribs 23.

Furthermore, a pin 19 is inserted between the two ribs 23 so that it passes through a notch 33 in the periphery of the sealing ring 24 thus preventing the sealing member 21 from rotating with the shaft 34.

Also in this embodiment of the invention a ring-shaped gasket is provided which bears against the surface of the shaft and is connected resilient in the radial direction to a mounting ring rigidly secured to the housing of the sealing device. The ring-shaped felt gasket 28 can follow the radial movements of the shaft without difficulty and without detracting from the quality of the seal.

The described sealing device is particularly suitable for sealing the working chambers of kneading and mixing machines which have a shaft that rotates and simultaneously moves to and fro.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description and all changes which come within the meaning and range of equivalency of the claim are therefore intended to be embraced therein.

I claim:

1. A sealing device for a shaft (2, 34) rotatably mounted centrally within a cylindrical housing (1, 1' or 25) and having a rotation axis of the shaft (3) which deviates from the longitudinal axis (4) of the housing to carry out simultaneous to-and-fro movement as a result of pressure exerted against the sealing device in a working chamber through which said shaft extends, said device comprising:

(a) seating means (7, 32) in an inner wall of said housing for detachably receiving a mounting ring (5, 22);

(b) a rigid mounting ring (5, 22) which is adjustably secured to an inner wall of said housing and thereby held against rotation;

(c) a ring-shaped sealing means (8, 21) including retaining means (9 and 30, 31) and a compressible sealing ring gasket (11, 28) clamped between said retaining means and the surface of said shaft;

(d) a flexible intermediate mounting ring (15, 29) fixed to the outer surface of said rigid mounting ring which urges said ring-shaped sealing means (8, 21) against said rotating shaft while pressure is being exerted against the sealing device under kneading and mixing action in the working chamber; and (e) a ring guide means for said rigid mounting ring in which said compressible ring gasket is formed of two halves which are radially moved in said rigid mounting ring and wherein said retaining means are threaded and located at a plurality of spaced points about the periphery of the mounting ring to bear against the two halves of said sealing gasket and thereby assure a tight sealing connection of the compressible ring gasket in accordance with radial movements of the shaft.

References Cited

UNITED STATES PATENTS

| 1,982,252 | 11/1934 | Heggem | 277—30 |
| 2,219,064 | 10/1940 | Boyer et al. | 277—30 |
| 2,624,599 | 1/1953 | Eaton | 277—30 |
| 2,806,748 | 9/1957 | Krotz et al. | 277—30 X |

FOREIGN PATENTS

| 902,452 | 9/1962 | Great Britain. |

SAMUEL ROTHBERG, Primary Examiner

U.S. Cl. X.R.

277—97, 174